US006937932B2

United States Patent
Sauter

(10) Patent No.: US 6,937,932 B2
(45) Date of Patent: Aug. 30, 2005

(54) DETECTING THE CLUTCH STATE DURING ENGINE DRAG TORQUE REGULATION

(75) Inventor: Thomas Sauter, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 10/400,778

(22) Filed: Mar. 26, 2003

(65) Prior Publication Data

US 2003/0220171 A1 Nov. 27, 2003

(30) Foreign Application Priority Data

Mar. 26, 2002 (DE) .......................................... 102 13 386
Aug. 22, 2002 (DE) .......................................... 102 38 464

(51) Int. Cl.[7] ....................... B60K 41/22; B60K 41/04; G06F 17/00
(52) U.S. Cl. ............................. 701/67; 477/174; 464/40
(58) Field of Search .......................... 701/67; 192/3.58, 192/3.63, 83, 103 F, 103 R, 26, 36; 477/174, 175, 180; 464/40, 41

(56) References Cited

U.S. PATENT DOCUMENTS

| 2,830,466 | A | * | 4/1958 | Myers ........................ 74/650 |
|---|---|---|---|---|
| 2,875,627 | A | * | 3/1959 | Rugen et al. ................. 74/339 |
| 3,090,473 | A | * | 5/1963 | Askins ....................... 192/3.23 |
| 4,088,210 | A | * | 5/1978 | Hoff .......................... 192/17 D |
| 5,024,305 | A | | 6/1991 | Kurihara et al. ............. 477/175 |
| 5,274,553 | A | * | 12/1993 | Boardman .................... 701/55 |
| 5,333,108 | A | | 7/1994 | Hessmert et al. ............. 701/84 |
| 5,427,215 | A | | 6/1995 | Jarvis ........................ 192/3.63 |
| 6,014,603 | A | * | 1/2000 | Le Van ........................ 701/52 |
| 6,223,874 | B1 | * | 5/2001 | Wheeler ................. 192/103 F |
| 6,250,448 | B1 | | 6/2001 | Salecker et al. ......... 192/103 F |
| 6,364,813 | B1 | * | 4/2002 | Patel et al. .................. 477/174 |
| 6,507,780 | B2 | * | 1/2003 | Graf ............................ 701/51 |
| 6,536,569 | B2 | * | 3/2003 | Nishimura ................. 192/3.58 |

* cited by examiner

*Primary Examiner*—Tan Q. Nguyen
*Assistant Examiner*—Dalena Tran
(74) *Attorney, Agent, or Firm*—Kenyon & Kenyon

(57) ABSTRACT

A method and a device for detecting the clutch state in a motor vehicle, in particular during engine drag torque regulation, is described. A particularly simple and cost-effective method of detecting the clutch state is made possible by determining the engine speed and a wheel speed and by calculating a gear ratio therefrom. Threshold values for the overall gear ratio are stored in the system for at least each of the lower gears (e.g., the first through the third gear). The clutch state may be identified by comparing the calculated overall gear ratio with the threshold values of the particular gear.

13 Claims, 4 Drawing Sheets

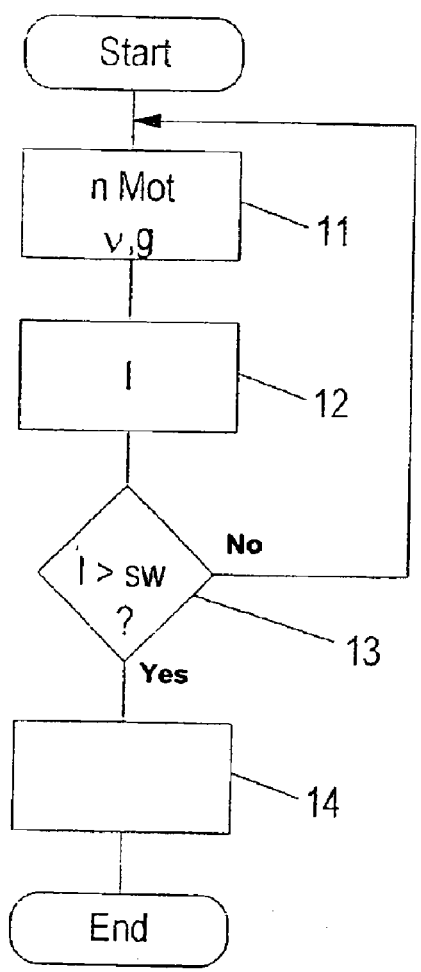
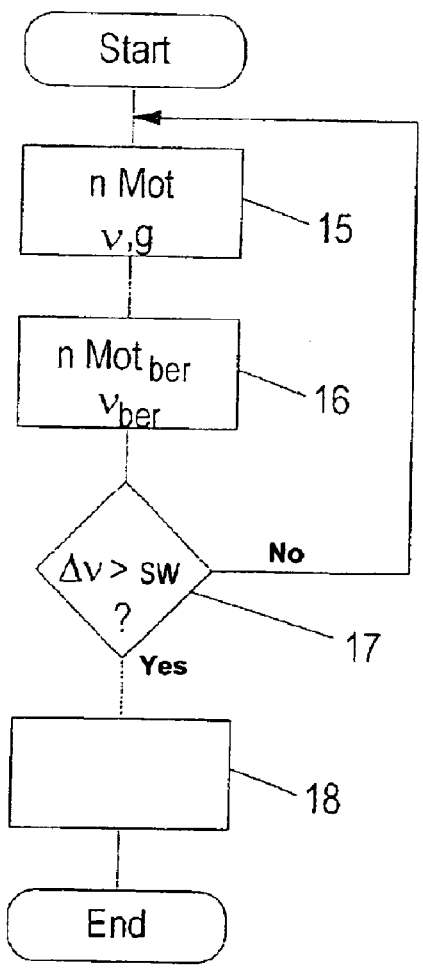
Fig. 3
Fig. 4

DETECTING THE CLUTCH STATE DURING ENGINE DRAG TORQUE REGULATION

FIELD OF THE INVENTION

The present invention relates to a method and a device for detecting the clutch state in a motor vehicle.

BACKGROUND INFORMATION

During downshifting or sudden throttling on a slippery road surface, the driven wheels of a vehicle may slip due to the engine braking effect. In order to continually ensure sufficient driving stability, the engine drag torque regulation (EDTR) generates additional engine torque as soon as a driven wheel slips and falls below a specified slip threshold. During the increase of the engine torque it must be assured that the clutch is engaged. The torque addition would otherwise only result in an increased engine speed with accompanying extreme engine noise.

Declutching during engine drag torque regulation occurs mostly at the beginning of the regulation when the driver is startled because the vehicle starts to slip after downshifting, but also at sudden throttling on a slippery road surface—in particular when traveling through curves—and the stabilizing reaction of the EDTR is not yet noticeable due to the delay of the system.

The extreme engine noise is sensed by the driver as at least unpleasant, but it may also startle the driver, thereby creating dangerous situations.

The use of clutch switches for detecting the clutch state is known. However, these switches are relatively expensive and require individual wiring.

Determining the clutch state by comparing the current overall gear ratio with the overall gear ratio of the first gear is also known. If quotient Nmot/vman, proportional to the overall gear ratio (Nmot: engine speed; vman: average speed of the driven wheels), is greater than the overall gear ratio of the first gear, then a declutched state is identified.

This method of detecting the clutch state is clearly shown in FIG. 1. Engine speed Nmot is plotted in the figure over the average speed of the driven wheels vmna for different gears. The characteristic lines for the individual gears are marked with reference numbers 5–8 (first gear 5 through fourth gear 8).

The overall gear ratio Iges is 10 in the first gear for example and 3.7 in the third gear for example. A declutched state is identified in this case when the determined quotient Nmot/vman lies above the quotient of the first gear (thus in the entire area 9); in order to prevent interfering effects, a certain distance (dashed line 10) to the gear ratio of first gear 5 is adhered to.

In order for this declutch detection to respond, the engine speed, driven by the EDTR increase momentum, increases considerably. The lower the gear step (second, third, or fourth gear), thus the lower the overall gear ratio where declutching takes place, the more the speed increases so that the declutch detection responds. This is associated with a corresponding surge of the engine noise.

SUMMARY OF THE INVENTION

Therefore, it is an object of the present invention to create a method and an appropriate device for detecting the clutch state, with which a declutching operation may be detected as early as possible in order to prevent extreme engine noise, in particular during engine drag torque regulation or anti-spin regulation. At the same time, the method and the device should be as simple and cost-effective as possible.

What the present invention does is to determine the engaged gear, the current engine speed, and the wheel speed, then to form a quotient from engine speed and wheel speed and compare this quotient (or a value derived therefrom, such as the overall gear ratio) with a threshold value for the current gear which is stored in the system. If the quotient or the calculated overall gear ratio exceeds the threshold value for the currently engaged gear, then the conclusion may be drawn that the gear is disengaged. Due to the fact that an individual threshold value is specified for at least the first two gears, and preferably also for the third gear, the declutch detection responds already at a relatively slight increase in engine speed, thus preventing extreme engine noise.

According to a preferred embodiment of the present invention, an upper and a lower threshold value for the quotient or the gear ratio are stored in the system for at least the first gears ($1^{st}$, $2^{nd}$, and preferably also $3^{rd}$). As long as the currently calculated quotient is within the specified limits, an engaged state may be assumed. A declutched state is identified when the calculated quotient or the overall gear ratio exceeds one of the limits of a gear step.

The threshold values specified for the individual gears are preferably selected such that erroneous detections due to vibrations in the drive train or interferences through roadway effects, which cause the calculated quotient to vary, for example, are prevented. A tolerance range for interferences is thus provided.

According to another embodiment of the present invention, the engaged gear is determined, the current engine speed and the wheel speed are measured, and then the engine speed or the wheel speed is calculated for the current gear. The measured and calculated engine speed or wheel speed is subsequently compared. A declutched state is identified when the difference between the measured and calculated wheel speed or engine speed exceeds a specified threshold value.

The engine speed or the wheel speed may be calculated on the basis of the following relation:

$$Nmot = I \cdot v_{measured},$$

I being the gear ratio of the current gear or a value proportional thereto. This calculated value is then compared with measured engine speed $Nmot_{measured}$.

In the same way, wheel speed v may be calculated back from measured engine speed $Nmot_{measured}$ and compared with measured wheel speed $v_{measured}$. Parameter I is preferably stored in the system.

The clutch state is preferably checked constantly so that, after re-engaging, the engaged state is identified when the calculated overall gear ratio returns to the range between the specified limit values.

According to a further embodiment of the present invention, the differentiated engine speed dNmot/dt is determined and a rotary acceleration resistance moment MWBR is calculated therefrom. The following applies for the acceleration resistance moment of the engine:

$$MWBR_{mot}[Nm] = Jmot[kgm^2] \cdot dNmot/dt[1/sec^2], \text{ where}$$

$$Jmot[kgm^2] = J\text{crankshaft drive} + J\text{clutch disk} + J\text{transmission input } [kgm^2]$$

J: moment of inertia

The mean acceleration of a driven wheel Dvman is determined and the rotary acceleration resistance moment is also calculated therefrom. The following applies for the acceleration resistance moment of the engine, in this case taking gear ratio Iges of the drive train into account:

$MWBR_{mot}[Nm] = Jmot[kgm^2] \cdot Iges \cdot Dvman[m/sec^2]/r[m]$, where $Jmot[kgm^2] = Jcrankshaft\ drive + Jclutch\ disk + Jtransmission\ input\ [kgm^2]$ r: wheel radius [m]

An engaged state may be assumed when the results of both calculations for the acceleration resistance moment match, or when the difference is smaller than a specified threshold value.

If both values differ by more than a specified amount, a declutched state is identified and the EDTR is deactivated if necessary.

BRIEF DESCRIPTION OF THE DRAWINGS

FIG. 3 shows a flow chart explaining the declutch detection according to a first embodiment of the present invention.

FIG. 4 shows a flow chart explaining the declutch detection according to a second embodiment of the present invention.

DETAILED DESCRIPTION

Figure 1:
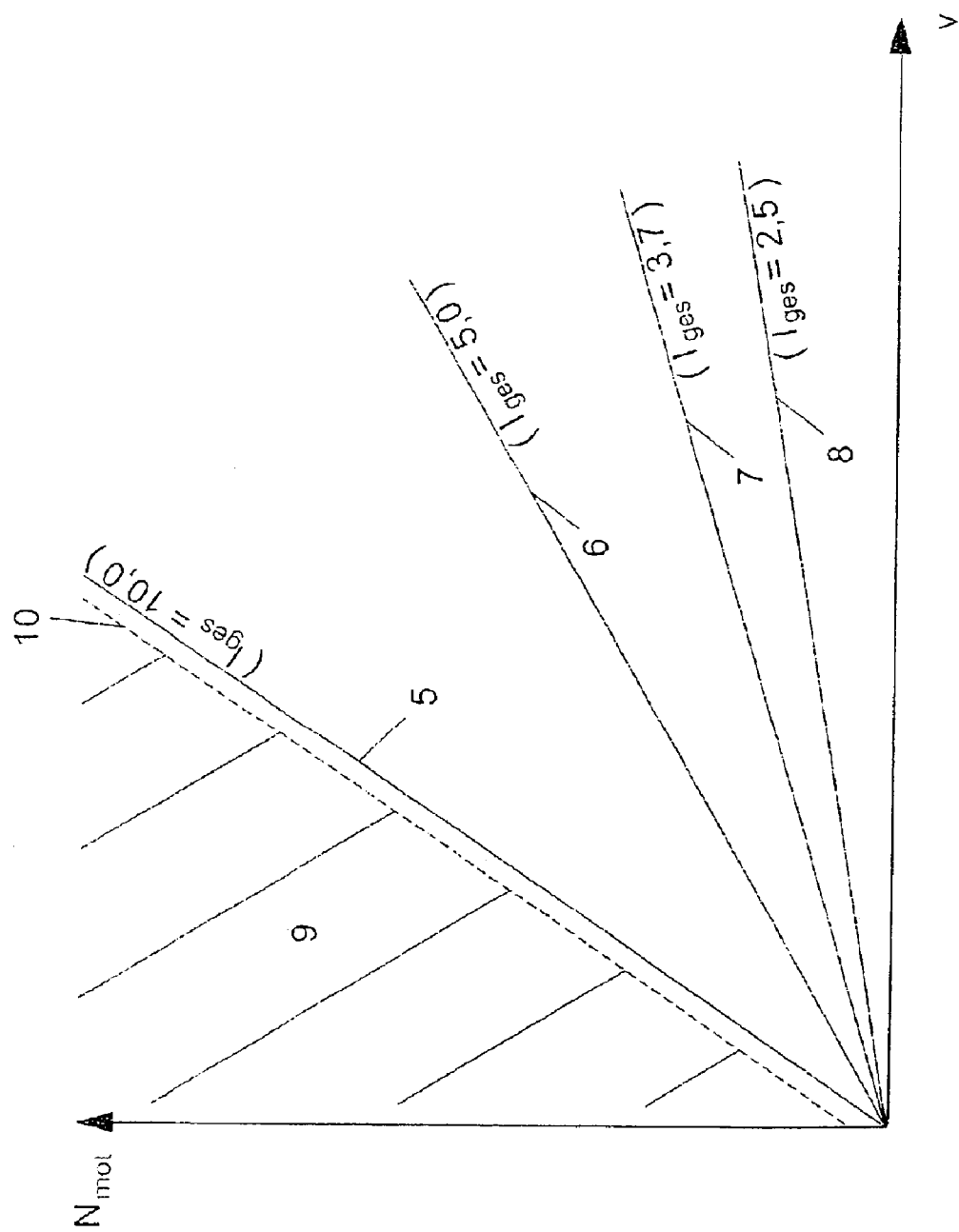
FIG. 1 shows an illustration explaining a clutch state detection according to the related art.
Figure 2:
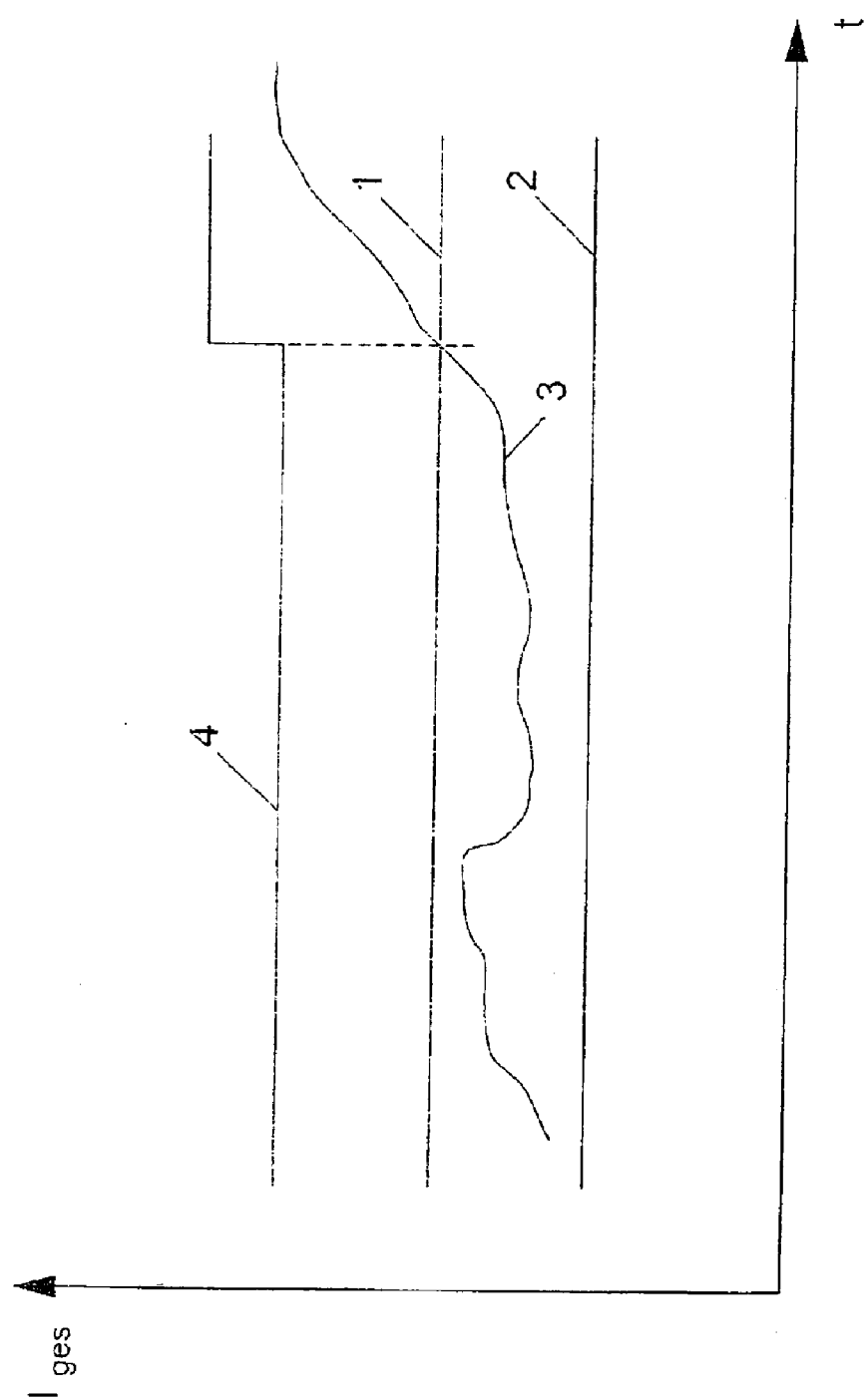
FIG. 2 shows an illustration explaining the clutch detection logic according to one embodiment of the present invention.

FIG. 2 shows the curve of calculated overall gear ratio 3 which has been determined on the basis of the following relation:

$$Iges = \frac{Ua[m] \cdot Nmot[1/\min]}{vman[m/s]} \cdot 0.01666$$

Reference numbers 1 and 2 indicate an upper and a lower threshold value for the overall gear ratio in the second gear. Corresponding threshold values, at least also for the first and third gear, are stored in the system.

An engaged state may be assumed when calculated overall gear ratio 3 is within specified threshold values 1 and 2. In this case, an associated flag "declutched" 4 is in the low state.

The conclusion may be drawn that the gear is disengaged when the calculated overall gear ratio exceeds one of limit values 1 and 2. In this case, flag 4 switches into the high state.

The comparison between calculated overall gear ratio 3 and specified limit values 1 and 2 is subsequently continued. Flag 4 is reset and the EDTR is reactivated when calculated overall gear ratio 3 returns to the range between limit values 1 and 2.

The clutch state in a vehicle may thus be determined in a simple way without causing racing of the engine and the noise associated with it.

FIG. 3 shows a method of detecting the clutch state in the form of a flow chart. Engine speed nMot, current wheel speed v, and the currently engaged gear are determined here in a first step 11. A quotient I is calculated in step 12 from determined engine speed nMot and wheel speed v.

In step 13, the calculated quotient is compared with a threshold value 1, 2 for the current gear which is stored in the system; the declutched state is identified in step 14 when the calculated quotient exceeds threshold value 1, 2.

According to another embodiment of the present invention, in a first step 15, engine speed nMot, current wheel speed v, and currently engaged gear g are determined and an engine speed $nMot_{cal}$ or a wheel speed $v_{cal}$ are calculated in step 16 based upon determined wheel speed v or engine speed nMot.

The calculated value is compared with the measured value in step 17, a declutched state being concluded in step 18 when the difference between the calculated value and the measured value exceeds a specified threshold value sw.

Figure 5:
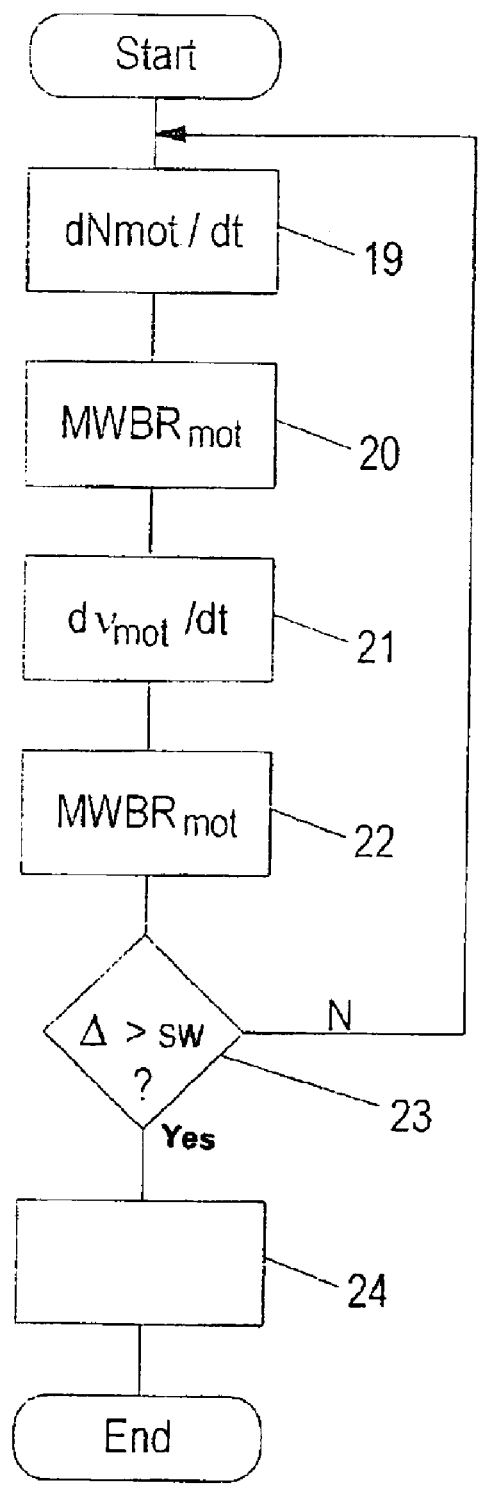
FIG. 5 shows a flow chart explaining the declutch detection according to a third embodiment of the present invention.

A further embodiment of the present invention is illustrated in FIG. 5, the detection of the clutch state taking place by calculating a rotary acceleration resistance moment.

Engine acceleration dnMot/dt is initially determined in step 19 and a rotary acceleration resistance moment MWBRmot is calculated in step 20 based upon the engine acceleration. Acceleration dvan/dt of the driven wheels is additionally determined in step 21 and a rotary acceleration resistance moment MWBRmot is calculated in step 22 based upon the acceleration of the driven wheels. Both calculated values for rotary acceleration resistance moment MWBRmot are compared in step 23, and a declutched state is identified in step 24 when the deviation of both values is greater than a specified threshold value sw.

LIST OF REFERENCE NUMBERS 1 upper threshold
2 lower threshold
3 current calculated overall gear ratio
4 flag
5–8 overall gear ratios
9 range of the declutched state
10 tolerance curve
11–24 method steps

What is claimed is:

1. A method of detecting a state of a clutch in a vehicle, comprising:
   determining a currently engaged gear, an engine speed, and a current wheel speed;
   calculating a quotient from the determined engine speed and the determined wheel speed;
   comparing one of the calculated quotient and a value derived from the calculated quotient with a threshold value that is stored in a system and is for the current gear; and
   identifying the state of the clutch as a declutched state when one of the calculated quotient and the derived value exceeds the threshold value.

2. The method as recited in claim 1, wherein:
   the state of the clutch is detected during an engine drag torque regulation.

3. The method as recited in claim 2, further comprising:
   deactivating the engine drag torque regulation when the declutched state is identified.

4. The method as recited in claim 1, wherein:
   an upper threshold value and a lower threshold value are specified for at least each first gear, and
   the declutched state is identified when the calculated quotient one of exceeds and falls below a respective one of the upper threshold value and the lower threshold value.

5. A method of detecting a state of a clutch in a vehicle, comprising:

determining a currently engaged gear, an engine speed, and a current wheel speed;

performing one of the following:
        calculating the engine speed based upon the determined wheel speed, and
        calculating the wheel speed based upon the determined engine speed;

performing one of the following:
        comparing the calculated engine speed with the determined engine speed, and
        comparing the calculated wheel speed with the determined wheel speed; and identifying the state of the clutch as a declutched state when one of a difference between the calculated engine speed and the determined engine speed and a difference between the calculated wheel speed and the determined wheel speed exceeds a specified threshold value.

6. The method as recited in claim 5, wherein:

the state of the clutch is detected during an engine drag torque regulation.

7. The method as recited in claim 6, further comprising:

deactivating the engine drag torque regulation when the declutched state is identified.

8. The method as recited in claim 5, wherein the engine speed is calculated based on a gear ratio of the current gear.

9. The method as recited in claim 5, wherein the engine speed is calculated based on a value proportional to a gear ration of the current gear.

10. A method of detecting a state of a clutch in a motor vehicle, comprising:

determining an engine acceleration;

calculating a first value corresponding to a rotary acceleration resistance moment based upon the engine acceleration;

determining an acceleration of a driven wheel of the motor vehicle;

calculating a second value corresponding to a rotary acceleration resistance moment based upon the acceleration of the driven wheel;

comparing the first value and the second value; and identifying the state of the clutch as a declutched state when a deviation of the first value and the second value is greater than a threshold value.

11. The method as recited in claim 10, wherein:

the state of the clutch is detected during an engine drag torque regulation.

12. The method as recited in claim 11, further comprising:

deactivating the engine drag torque regulation when the declutched state is identified.

13. The method as recited in claim 10, further comprising:

calculating a rotary acceleration resistance moment of one of an engine and a power train.

\* \* \* \* \*